(No Model.) 2 Sheets—Sheet 1.
H. P. CLAUSSEN.
FRICTION CLUTCH.
No. 429,085. Patented May 27, 1890.
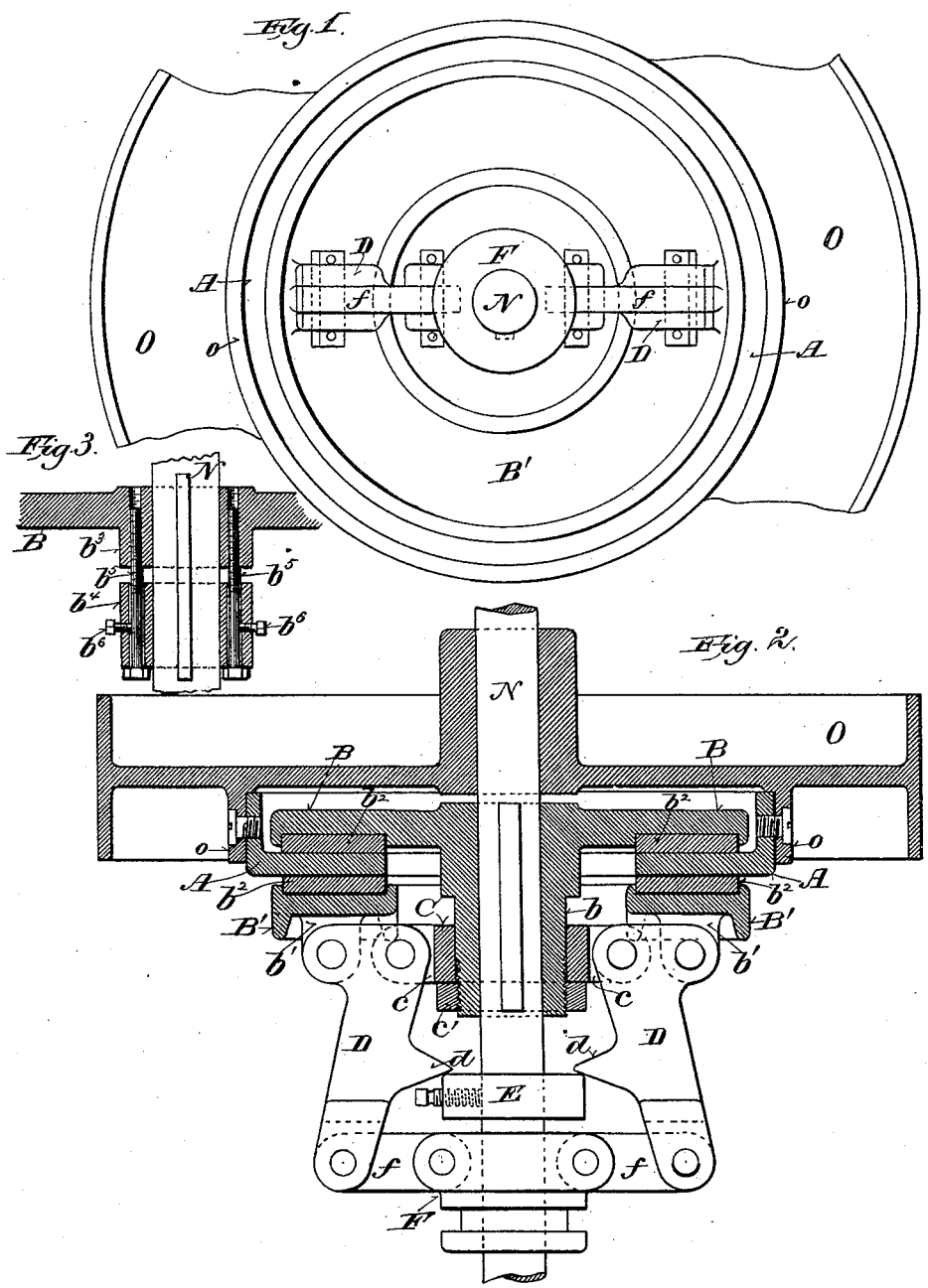
WITNESSES:
E. E. Asmus
Chas. L. Goss
INVENTOR,
Hans P. Claussen
By Winkler, Flanders, Smith, Bottum & ...
ATTORNEYS.

(No Model.) H. P. CLAUSSEN. 2 Sheets—Sheet 2.
FRICTION CLUTCH.
No. 429,085. Patented May 27, 1890.
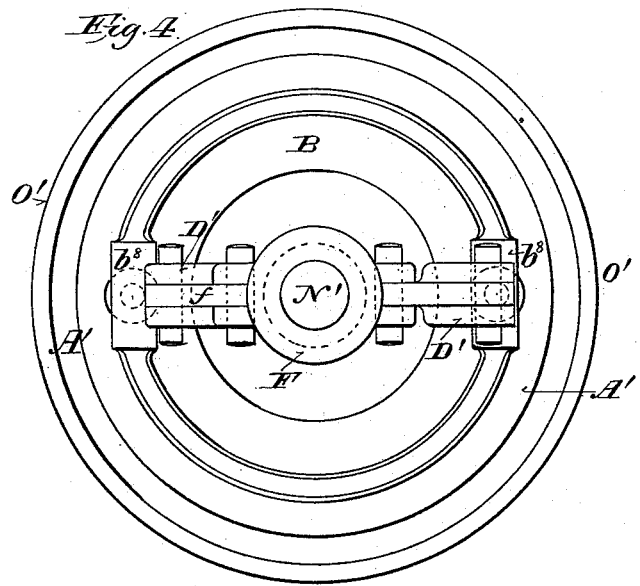
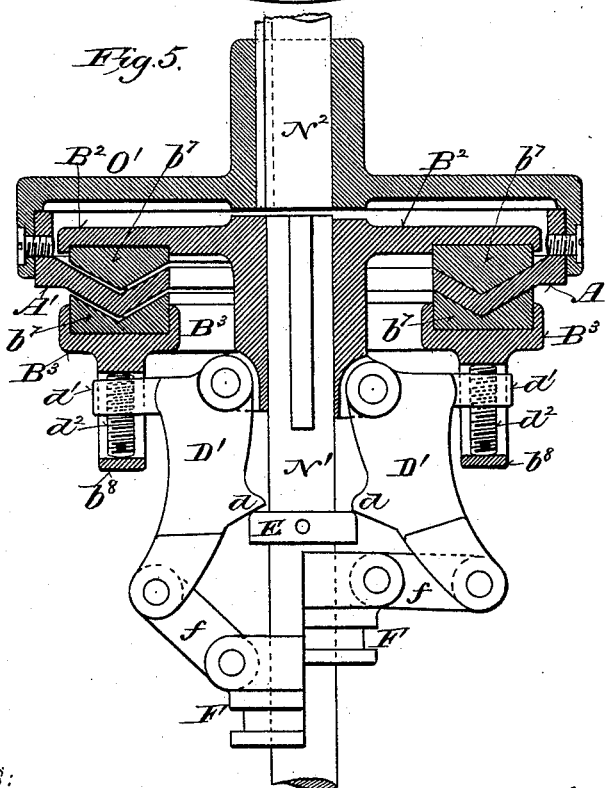
WITNESSES: INVENTOR,
Hans P. Claussen,
By Winkler, Flanders, Smith, Bottum & Vilas
ATTORNEYS.

UNITED STATES PATENT OFFICE.

HANS P. CLAUSSEN, OF MILWAUKEE, WISCONSIN, ASSIGNOR TO THE BRUNO NORDBERG COMPANY, OF WISCONSIN.

FRICTION-CLUTCH.

SPECIFICATION forming part of Letters Patent No. 429,085, dated May 27, 1890.

Application filed August 20, 1889. Serial No. 321,380. (No model.)

*To all whom it may concern:*

Be it known that I, HANS P. CLAUSSEN, of Milwaukee, in the county of Milwaukee and State of Wisconsin, have invented certain new and useful Improvements in Friction-Clutches; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to increase the efficiency, to facilitate the operation and adjustment, and generally to improve the construction of friction-clutches.

It consists, essentially, of a pair of clamping disks or rings movable toward and from each other endwise of the supporting-shaft, of an intermediate ring or disk adapted to be engaged on both sides by said clamping rings or disks, of suitable means of moving said clamping disks or rings into and out of engagement with the intermediate disk or ring and of locking the same in engagement, and of suitable means of adjustment for taking up the wear on the working-faces of said disks or rings, and of certain other peculiarities of construction and arrangement hereinafter particularly described, and pointed out in the claims.

In the accompanying drawings like letters designate the same parts in the several figures.

Figure 1 is a side elevation of my improved clutch applied to a pulley. Fig. 2 is an axial section of the same. Fig. 3 is an axial section of a portion of the clutch, showing a modification of the means of adjustment for taking up wear. Fig. 4 is a side elevation of a modified form of the clutch designed for a cut-off coupling; and Fig. 5 is an axial section of the same, the right-hand portion of Figs. 4 and 5 representing the clutch in engagement and the left-hand portion showing it out of engagement.

Referring to Figs. 1 and 2, O represents a pulley to which my improved clutch is applied, loosely mounted upon the shaft N.

A is a ring attached to the pulley, as shown, by means of a flange $o$, formed thereon for the purpose, or by any other suitable means. B is a wheel or disk placed with its periphery between said ring A and pulley and having a hub $b$, which is feathered upon the shaft N so as to permit of the lateral movement of said disk, but to cause it to turn with said shaft.

B' is a ring placed on the opposite side of the ring A and formed on its outer face with ears $b'$, to which are pivoted the shorter arms of the angular levers D D, pivoted at their angles to ears $c$ $c$ on a collar C, mounted upon the hub $b$ of the disk B. These levers are formed on the sides toward the shaft N with projections $d$ $d$, the outer inclined faces of which are adapted to engage with a shoulder or collar E, fixed upon the shaft N, for the purpose of moving the disk B and ring B' away from the ring A when the longer arms of said levers are drawn toward each other for the purpose of throwing the clutch out of engagement. At their outer ends the longer arms of said levers D are connected by links $f$ $f$ with a sleeve F, movable lengthwise on the shaft N, for the purpose of moving the clamping-disk and ring B B' into and out of engagement with the ring A. Any suitable means (not shown) may be employed for moving the sleeve F, such as a forked lever of the usual construction.

The clamping-rings B B', adjacent to the ring A, are provided with facings $b^2$ $b^2$, of wood, vulcanized fiber, paper, or any other suitable friction material, attached thereto in any suitable manner.

For the purpose of taking up wear on the friction-surfaces, I provide an adjusting-nut $c'$, threaded upon the outer end of the hub $b$ of disk B, by which means the collar C, to which the levers D D are fulcrumed, may be moved toward the disk B as the working-faces of the rings are worn away.

Other means of adjustment for taking up wear may be employed—as, for instance, referring to Fig. 3, the hub of the disk B may be divided transversely to its axis into two parts $b^3$ and $b^4$, the levers D being fulcrumed to the latter, and these parts connected by adjusting-screws $b^5$, threaded into the part $b^3$ and held when adjusted in the part $b^4$ by set-bolts $b^6$. As the friction-surfaces of the clutch are worn away the sections $b^3$ $b^4$ of the hub may be drawn together by turning up these adjusting-screws $b^5$. As in the construction previously described, both sections of the hub are movable together upon a feather lengthwise of the shaft N.

Referring to Figs. 4 and 5, illustrating a modification of the clutch designed for use as a cut-off coupling for connecting and disconnecting shafting, the clamping disk and ring $B^2$ $B^3$ are mounted upon a shaft N, in the manner previously described, and the intermediate ring A′ is attached to a disk or wheel fixedly mounted upon the adjacent end of a separate shaft $N^2$, in line with the shaft N′.

For the purpose of securing greater area of contact and a stronger grip, I may make the intermediate ring A′ V-shaped in cross-section and the facings $b^7$ $b^7$ of the disk $B^2$ and ring $B^3$ to correspond therewith, as shown in Fig. 5. This construction of the friction-surfaces also insures the centering of the shafts N′ $N^2$ when the clutch is in engagement. The levers D′ are fulcrumed directly to the outer end of the hub of disk $B^2$, and are connected, as previously described, at the outer ends of their longer arms by links $ff$ with the sliding sleeve F.

For the purpose of adjustment to take up wear on the friction-surfaces, I form loops $b^8$ $b^8$ on the outer face of the ring $B^3$ and provide the levers D′ at the outer ends of their shorter arms with screw-threaded ears $d'$ $d'$, in which are inserted adjusting-screws $d^2$ $d^2$, the rounded ends of which bear against the opposite inner faces of the loops $b^8$, as shown in Fig. 5. By turning these screws in or out the working-faces of the clutch may be adjusted to take up wear and to properly engage each other when moved into and out of contact by the levers D′.

To throw the clutch into engagement, the sleeve F is moved toward the collar E till the links $ff$ pass a straight line perpendicular to the shaft N, thereby automatically holding the clutch in engagement until the sleeve F is moved away from the collar E sufficiently to carry the links $ff$ to the opposite side of such straight line. When the longer arms of the levers D D are thrown outwardly by the movement of sleeve F toward collar E, the clamping-disk B and ring B′, through their connections with the shorter arms of said levers, are moved simultaneously in opposite directions into engagement with the opposite faces of the interposing ring A.

To throw the clutch out of engagement, sleeve F is moved away from the collar E, thereby drawing the outer ends of the longer arms of levers D D toward each other and the outer inclined faces of the projections $d$ $d$ inwardly over the edge of collar E, thereby carrying the fulcrums of said levers and the disk B, to which they are attached, toward the pulley O, at the same time moving the ring B′ in the opposite direction, away from the ring A.

The modified form of the clutch shown in Figs. 4 and 5 operates in substantially the same manner, except as to the effect of the V-shaped friction-surfaces in centering the two shafts, which are connected by the clutch.

Various changes in the details of construction and arrangement of the parts composing the clutch may be made without departing from the principle of its operation or the spirit of my invention. For example, the clamping-rings may be made in segmental form instead of continuous, as shown. I prefer, however, the construction shown and described.

I claim—

1. In a friction-clutch, the combination of friction rings or jaws one of which is provided with a hub, a collar connected with and adjustable lengthwise of said hub, bell-crank levers fulcrumed to said collar and pivoted by one set of arms to and carrying the other ring or jaw, and means for forcing the other set of arms outwardly from the axis of the clutch, so as to bring the friction-surfaces into engagement, substantially as and for the purposes set forth.

2. In a friction-clutch, the combination, with clamping rings or jaws movable toward and from each other, and an interposed disk or ring arranged to be engaged on opposite sides by said clamping rings or jaws, of angular levers connected with said clamping rings or jaws and provided with inclines, and a collar fixed on the clutch-shaft with which said inclines engage to move said clamping rings or jaws out of engagement with the interposed disk or ring, substantially as and for the purpose set forth.

3. In a friction-clutch, the combination, with a pair of clamping-rings movable toward and from each other lengthwise of the shaft upon which they are mounted, an interposed ring arranged to be engaged on opposite sides by said clamping-rings, levers fulcrumed to one of said clamping-rings and connected with the other and having projections which engage with a fixed collar on said shaft, and a sleeve movable lengthwise of said shaft and linked to said levers, substantially as and for the purposes set forth.

4. In a friction-clutch, the combination of a pair of clamping-rings one of which is provided with a hub movable lengthwise of the shaft upon which it is mounted, angular levers fulcrumed to said hub and having their shorter arms pivoted to the other clamping-ring, an interposed ring arranged to be engaged on opposite sides by said clamping-rings, and a sleeve movable lengthwise upon said shaft and linked to the longer arms of said levers, substantially as and for the purposes set forth.

5. In a friction-clutch, the combination of a pair of clamping-rings movable toward and from each other lengthwise of the shaft upon which they are mounted, an interposed ring arranged to be engaged on opposite sides by said clamping-rings, levers fulcrumed to one of said clamping-rings and having their shorter arms pivoted to the other, a sleeve movable lengthwise of said shaft and linked to the longer arms of said levers, and means of adjusting the connections between said levers and one of said clamping-rings, whereby wear on the working-faces of the clutch is taken up, substantially as and for the purposes set forth.

6. In a friction-clutch, the combination of a pair of clamping rings or jaws one of which is provided with a hub movable lengthwise of the shaft upon which it is mounted, a collar connected with and adjustable lengthwise of said hub, angular levers fulcrumed at their angles to said collar and having one set of arms pivoted to and carrying the other clamping ring or jaw, an interposed ring arranged to be engaged on opposite sides by said clamping rings or jaws, and means for forcing the other set of arms of said levers outwardly from the axis of the clutch, so as to move said rings or jaws into engagement with the interposed ring, substantially as and for the purposes set forth.

7. In a friction-clutch, the combination, with a pair of clamping-rings movable toward and from each other lengthwise of the shaft upon which they are mounted, an interposed ring arranged to be engaged on opposite sides by said clamping-rings, and angular levers fulcrumed to one of said rings and connected with the other and having projections adapted to engage with a collar fixed on said shaft, whereby said clamping-rings are moved out of contact with said interposed ring, substantially as and for the purposes set forth.

In testimony that I claim the foregoing as my own I affix my signature in presence of two witnesses.

HANS P. CLAUSSEN.

Witnesses:
   CHAS. L. GOSS,
   E. G. ASMUS.